Oct. 2, 1945.   A. R. HENRY   2,385,987
BUCKET SHOCK ABSORBER FOR LOADING DEVICES
Filed Jan. 8, 1945   2 Sheets-Sheet 1
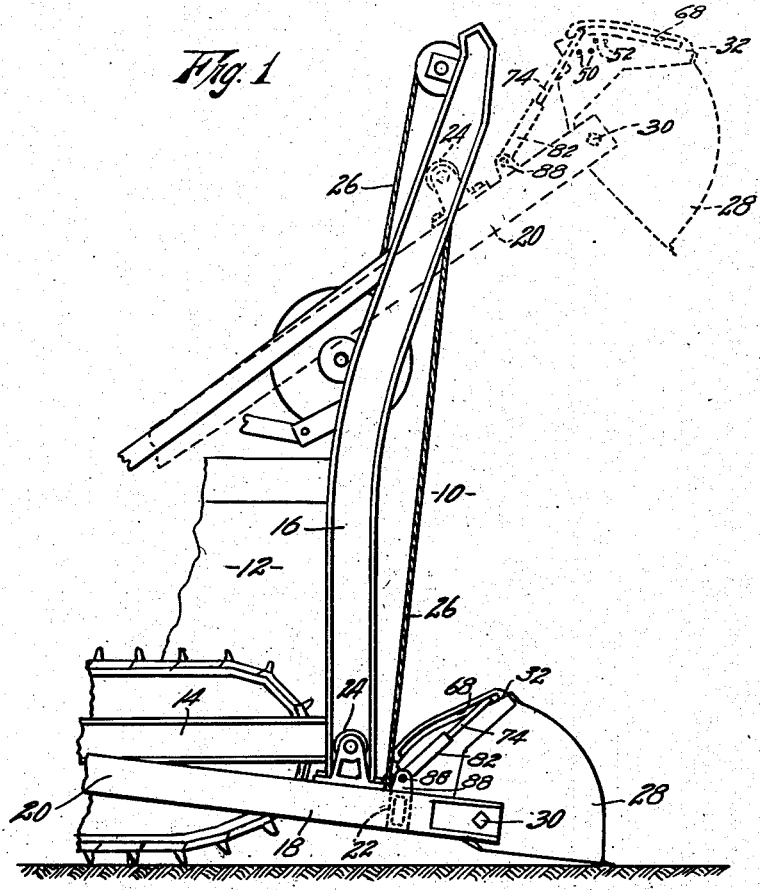
INVENTOR,
Albert R. Henry.
BY
Roy E. Hamilton,
Attorney.

Oct. 2, 1945.   A. R. HENRY   2,385,987
BUCKET SHOCK ABSORBER FOR LOADING DEVICES
Filed Jan. 8, 1945   2 Sheets-Sheet 2
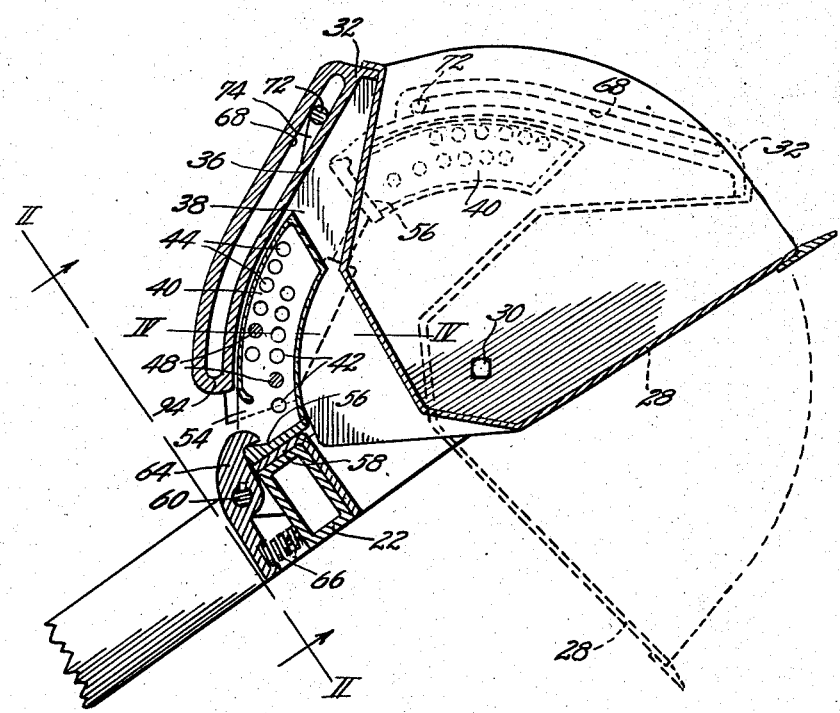
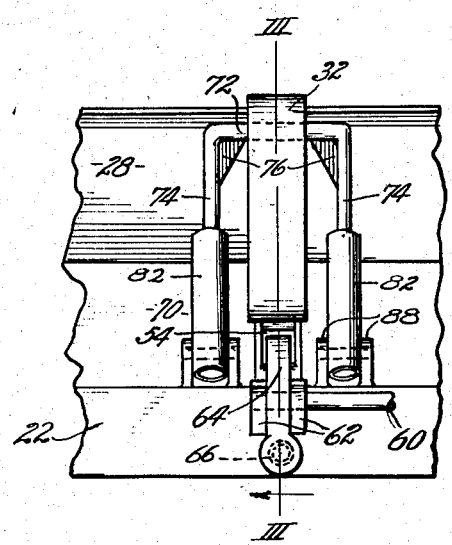
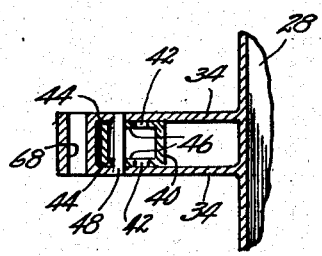
INVENTOR,
Albert R. Henry.
BY
Roy E. Hamilton,
Attorney.

Patented Oct. 2, 1945

2,385,987

UNITED STATES PATENT OFFICE 2,385,987

BUCKET SHOCK ABSORBER FOR LOADING DEVICES

Albert R. Henry, Salina, Kans.

Application January 8, 1945, Serial No. 571,861

6 Claims. (Cl. 214—146)

This invention relates to improvements in bucket shock absorber for loading devices, and has particular reference to a shock absorber having a pair of co-acting compression springs.

The principal object of the present invention is the provision of a simple, economical and durable shock absorber for dump buckets.

Another object of this invention is the provision of a shock absorber for buckets having manually adjusting means for varying the dumping angle of the bucket.

With these objects in view as well as other objects which will appear during the course of the specification, reference will be had to the specification wherein:

Figure 1 is a fragmentary, elevational view of a loading device provided with a dump bucket having a shock absorber embodying this invention.

Fig. 2 is an enlarged fragmentary, elevational view of the rear of the dump bucket and associated parts looking in the direction indicated by the section line II—II of Fig. 3.

Fig. 3 is a sectional view taken on line III—III of Fig. 2 with the bucket dotted in the dumping position.

Fig. 4 is a cross sectional view taken on line IV—IV of Fig. 3.

Fig. 5 is a longitudinal sectional view of the shock absorbing unit.

Fig. 6 is a fragmentary, elevational view of the bucket and attached bracket.

Throughout the several views like reference characters refer to similar parts and the numeral 10 designates a portion of a loading device such as shown in my co-pending application Serial No. 491,717 filed June 21, 1943. This loading device is mounted on and operated by a tractor 12 and includes a frame 14 provided with upwardly extending guide bars 16. A boom 18 comprising side arms 20 joined together adjacent their forward end by a cross bar 22 is slidably mounted at its rear end on pins carried by said frame and is provided adjacent its forward end with guide roller 24 which engage in guide bars 16. A cable 26 operable by the tractor is so mounted and attached that it serves to raise and lower the front end of the boom as indicated in solid and dotted lines in Fig. 1.

A bucket 28 of any suitable type is pivotally mounted for tilting oscillation on bolts 30 which are rigidly mounted in arms 20 in front of cross bar 22. It is apparent that the load carrying member might be of bucket form, fork or any other structure suitable for supporting and dumping a load of various types of material.

To the rear side of bucket 28 is rigidly attached by welding, or by any other suitable means, a bracket 32 having spaced apart side walls 34 and a connecting wall 36 to form a recess 38 open to the bottom to receive an adjustably mounted latch plate member 40. This latch plate member is of substantially arcuate box form and is provided with two concentric series of holes 42 and 44 which pass through the side walls 46 of the member. Pins 48 pass through respective holes of the series 42 and 44 and engage in holes 50 and 52 respectively formed through side walls 34 of bracket 32 to hold the latch plate member in fixed relation to bracket 32. The holes 42, 44, 50 and 52 are so relatively positioned and spaced that by utilizing certain of the sets of holes numerous and close adjustments of the parts may be obtained.

The member 40 is open at 54 to present a ledge or latch plate 56 which is adapted to rest on a buffer plate 58 secured to cross bar 22 when the bucket is in the loading position as shown in solid lines in Figs. 1 and 3. An operating rod 60 pivotally mounted in bearings 62 integral with cross bar 22 carries a rigidly attached latch member 64 which is adapted to engage latch plate 56 to secure the bucket in the loading position as shown in Fig. 3. A compression spring 66 positioned between the lower extremity of the latch 64 and the cross bar 22 serves to urge said latch to the latched position. Manual means for moving said latch to the released position may be provided as shown in my copending application. When the latch is moved to the released position the bucket will automatically tilt to the dumping position to release the load. The connecting wall 36 of bracket 32 is relatively thick and is provided with a longitudinally extending slot 68.

The principal object of this invention is to provide suitable means to cushion or absorb the shock of the tilting bucket and load as the bucket is dumped. This means comprises an inverted U-shaped member 70 having a cross bar or body 72 and side arms 74 reinforced at their junctions by gusset plates 76. Arms 74 pass through opening 78 formed through end plates 80 of tubes 82, which are transversely perforated at 84 to receive pins 86 carried by ears 88 which are rigidly secured to the top side of cross bar 22. The lower extremities of arms 74 are threaded at 89 to receive washers 90 and nuts 92. Mounted on each arm 74 in tubes 82 is a compression spring 94 positioned between end plate 80 and washer 90. The body portion 72 of member 70 is positioned in slot 68. This shock absorber is so positioned relative to the bucket and its attached parts that when the bucket is in the loading position the shock absorber will be inactive with cross body 72 positioned adjacent the upper extremity of slot 68; however, when the bucket tilts to the dumping position the cross body 72 will engage the end wall 94 of slot 68, as shown in dotted lines in Fig. 3. Due to the momentum of the bucket and load, it will tend to swing beyond the dumping position, thus compressing the spring 94 to absorb said force and to prevent objectional shock to the dumping parts. The normal at-rest position of body 72 in slot 68 may be varied by adjusting nuts 94 on arms 74, thus changing the at-rest dumping position of the bucket.

Having thus described my invention, what I claim as new and desire to be secured by Letters Patent is:

1. A dump bucket pivotally mounted for tilting between two boom arms joined by a cross bar disposed adjacent the rear of said bucket; latching means, including a vertically slotted bracket, operable to normally secure said bucket in the raised position; a U-shaped member having extensible arms pivoted to said cross bar and having its cross body portion slidably mounted in the slot of said bracket and its arm extremities pivoted to said cross bar; and a compression spring mounted on each of said extensible arms to resist extension thereof whereby when said bucket is dumped, said bracket will be moved to extend said arms and to compress said springs.

2. A dump bucket pivotally mounted for tilting on a boom; manually releasable latching means, including a vertically slotted bracket secured to said bucket, for securing said bucket in the raised position; a U-shaped member having extensible arms pivoted to said boom and having its cross body portion slidably mounted in the slot of said bracket and its arm extremities pivoted to said boom; and a compression spring mounted on each of said extensible arms to resist extension thereof whereby when said bucket is dumped said bracket will be moved to extend said arms and to compress said springs.

3. A dump bucket pivotally mounted for tilting between two boom arms joined by a cross bar disposed adjacent the rear of said bucket; latching means, including a vertically slotted bracket, operable to normally secure said bucket in the raised position; a U-shaped member having extensible arms pivoted to said cross bar and having its cross body portion slidably mounted in the slot of said bracket and its arm extremities pivoted to said cross bar; a compression spring mounted on each of said extensible arms to resist extension thereof whereby when said bucket is dumped said bracket will be moved to extend said arms and to compress said springs; and adjustable means for varying the normal length of said arms.

4. A dump bucket pivotally mounted for tilting between two boom arms having a cross bar adjacent the rear of said bucket; releasable means including a vertically slotted bracket for securing said bucket against tilting relative to said arms; a pair of spaced apart tubes pivoted to said cross bar; a U-shaped member positioned with its cross body portion slidably mounted in said bracket slot and having its arms disposed respectively in said tubes; and a compression spring in each of said tubes positioned to be compressed as said arms are forced outwardly from said tubes whereby the swinging moment of the dump bucket is absorbed during the dumping operation.

5. A dump bucket pivotally mounted for tilting between two boom arms having a cross bar adjacent the rear of said bucket; a latch plate carried by a vertical slotted bracket secured to said bucket; a latch member carried by said cross bar adapted to engage said latch blade to hold said bucket in the loading position; a pair of spaced apart tubes pivoted to said cross bars; a U-shaped member positioned with its cross body portion slidably mounted in the slot of said bracket and its arms disposed respectively in said tubes and secured therein by means of compression springs whereby said springs will be compressed during the dumping action of the bucket.

6. A dump bucket pivotally mounted for tilting between two boom arms having a cross bar adjacent the rear of said bucket; a vertically slotted bracket secured to said bucket; a latch member carried by said cross bar and adapted to engage said latch plate to secure said bucket in the loading position; a U-shaped member having extensible arms pivoted to said cross bar and having its cross body portion slidably mounted in the slot of said bracket and its arm extremities pivoted to said cross bar; and a compression spring mounted on each of said extensible arms to resist extension thereof whereby when said bucket is dumped said bracket will be moved to extend said arms and to compress said springs.

ALBERT R. HENRY.